United States Patent [19]

Audebert et al.

[11] Patent Number: 5,347,110
[45] Date of Patent: Sep. 13, 1994

[54] INFORMATION TRANSMISSION BY THE TIME MODULATION OF A CHARACTER DISPLAY AREA

[75] Inventors: Yves Audebert, Croissy-sur-Seine; Achille Delahaye, Chennevieres-Sur-Marne, both of France

[73] Assignee: Adventure, Issy-Les-Moulineaux, France

[21] Appl. No.: 820,672
[22] PCT Filed: Jul. 26, 1990
[86] PCT No.: PCT/FR90/00569
§ 371 Date: Jan. 28, 1992
§ 102(e) Date: Jan. 28, 1992
[87] PCT Pub. No.: WO91/02328
PCT Pub. Date: Feb. 21, 1991

[30] Foreign Application Priority Data

Jul. 28, 1989 [FR] France .................. 89 10201

[51] Int. Cl.5 ........................... G06K 19/067
[52] U.S. Cl. ....................... 235/380; 235/487; 341/175; 341/178
[58] Field of Search .......... 235/380, 454, 487, 491, 235/455; 250/214 AG; 340/765; 345/30, 50, 141, 148, 204; 341/175, 178

[56] References Cited

U.S. PATENT DOCUMENTS

| 4,088,265 | 5/1978 | Garczynski | 235/454 |
|---|---|---|---|
| 4,230,265 | 10/1980 | Casaly | 235/455 |
| 4,403,869 | 9/1983 | Crutcher | 368/10 |
| 4,528,445 | 7/1985 | Willmore et al. | 235/469 |
| 4,634,845 | 1/1987 | Hale et al. | 235/379 X |
| 4,783,598 | 11/1988 | McAdams, Jr. | 250/566 |
| 4,999,617 | 3/1991 | Uemura | 235/462 |
| 5,180,902 | 1/1993 | Schick et al. | 235/379 |

FOREIGN PATENT DOCUMENTS

| 0056064A1 | 7/1982 | European Pat. Off. . | |
|---|---|---|---|
| 0168836A2 | 1/1986 | European Pat. Off. . | |
| 3047322A1 | 7/1980 | Fed. Rep. of Germany . | |
| 2478849 | 9/1981 | France . | |
| 60-55461 | 3/1985 | Japan | 364/709.01 |
| 2-108184 | 4/1990 | Japan | 235/491 |
| 2-302890 | 12/1990 | Japan | 235/491 |

*Primary Examiner*—Davis L. Willis
*Assistant Examiner*—Edward H. Sikorski
*Attorney, Agent, or Firm*—Armstrong, Westerman, Hattori, McLeland & Naughton

[57] ABSTRACT

A system provides for transmission of information between an article carrying information and an apparatus for processing the information, in which the article includes an arrangement for modulating the reflectance of at least one area of a liquid crystal device as a function of information to be transmitted to the processing apparatus. The system includes a reader having a station for receiving the article, and an optical arrangement at the station which is sensitive to the reflectance of the area of the liquid crystal device to form signals representative of information given out by the article. Also included is an arrangement for the transmission of these signals to the processing apparatus. The liquid crystal device includes a screen for the display of alphanumeric information, which screen is associated with an apparatus for selectively commanding the display of alphanumeric characters on a plurality of areas of the screen in conformity with alphanumeric information computed in the article, and the binary modulation of the reflectance of at least one area of this screen from the transmission, to the reader, of the serial binary information computed in the article.

7 Claims, 3 Drawing Sheets

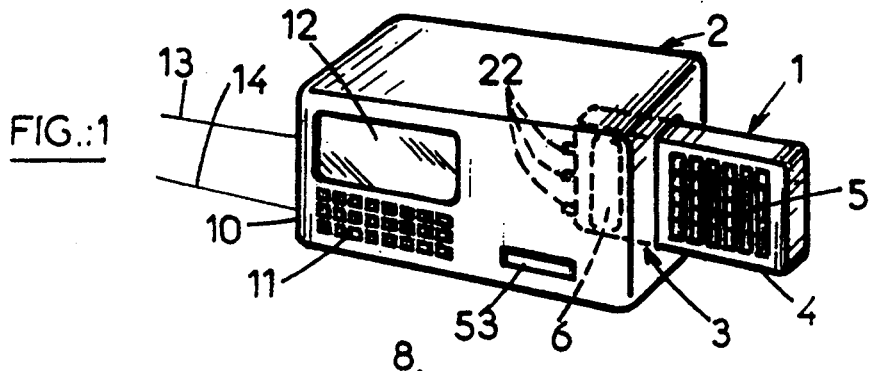
FIG.:1
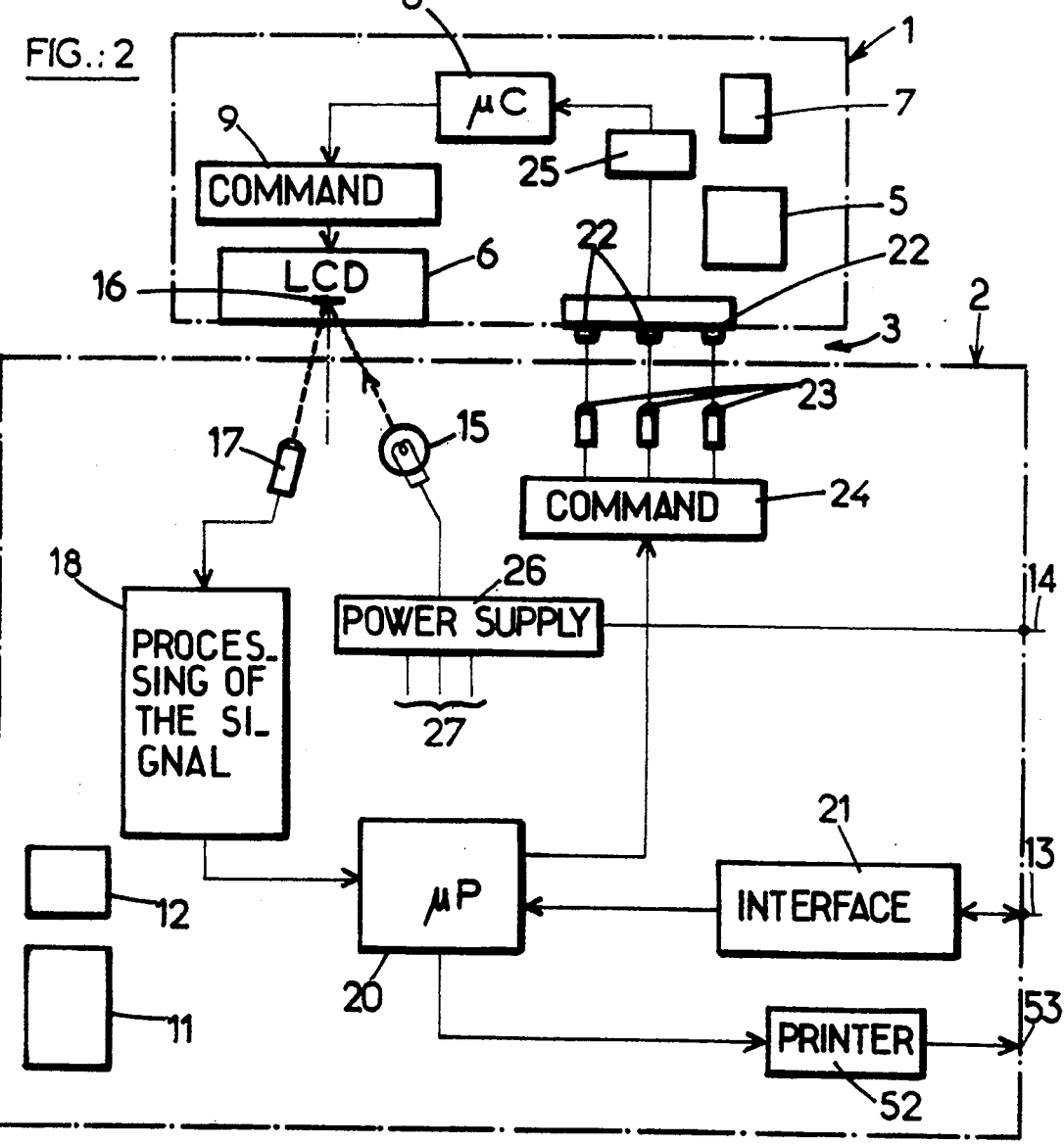
FIG.:2

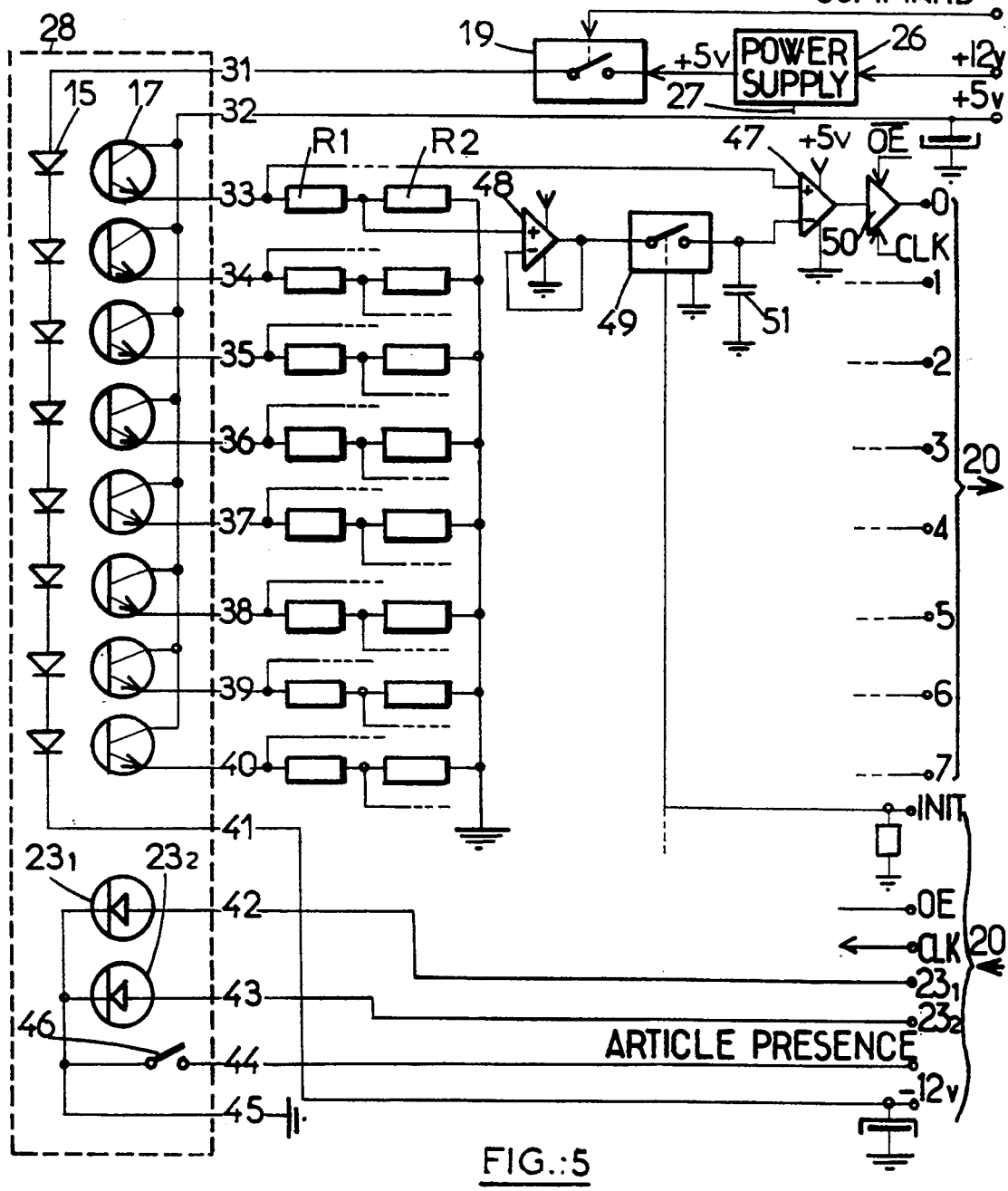

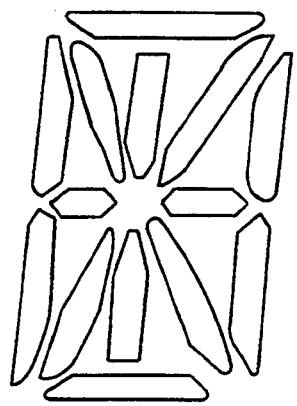 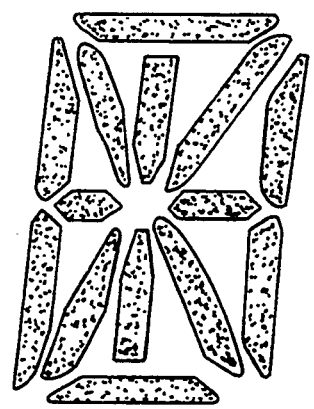
Fig.6(a)　　　　Fig.6(b)
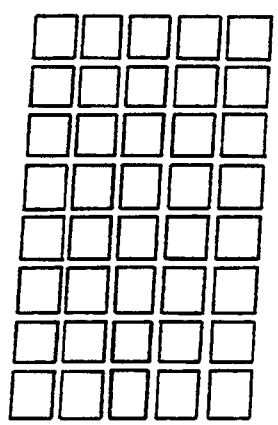 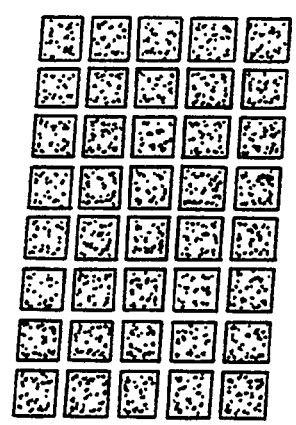
Fig.7(a)　　　　Fig.7(b)

INFORMATION TRANSMISSION BY THE TIME MODULATION OF A CHARACTER DISPLAY AREA

BACKGROUND OF THE INVENTION

The present invention relates to an information transmission system and, more particularly, to such a system designed to transmit information between a portable article and means for processing information computed in the portable article.

Nowadays, widespread use is made of portable articles comprising a central information processing unit, a keyboard enabling a user to input data into the central unit and to command the operation thereof and a visual display screen for the data acquired by the central unit or for intermediate or final results of the processings executed in this central unit. Where appropriate, such articles may comprise means for connection to other information processing equipment. As an example of such portable article we could cite pocket calculators.

European patent application no. 89401130.3 of Apr. 21, 1989 includes a description of a portable electronic device comprising optical receiving means, a microcomputer, a display device, an electrical power source to supply the various circuits and components of the device, a keyboard enabling the user to input information into the microcomputer and storage means. The microcomputer is programmed to receive via the optical receiving means and to store in the storage means data representative of a scenario appearing in a program broadcast by a transmitting station. Data input at the keyboard by the user of the device are taken into account during the running of the program and processed in such a manner as to produce a result or winning which is a function of the processing and is visually displayed on the display device.

This device, which is intended in particular for applications of the betting or gaming type, therefore aims to produce such a result or winning which must be transmitted to centralised management means in order to be allocated to the account of the user.

In order that this result or winning which is displayed should be transferred into these centralised management means, it is possible to request the user to read the display device and to copy over his reading to the keyboard of a specialised terminal, or to retransmit the displayed result by telephone, for example. Such transmission procedures involve a substantial percentage of human errors, which make them rather unsatisfactory.

It is then possible to contemplate providing the portable article or device with electrical means for connection to a communication network. However it is known that the presence of electrical connections creates problems of mechanical and/or electrical reliability. Moreover, they are a substantial burden upon the cost of the portable article; this is a serious disadvantage when this article is intended for widespread distribution demanding a low production cost, as is the case, in particular, in the betting or gaming applications mentioned above.

Furthermore, the U.S. Pat. No. A-4,575,621 discloses a transaction device, of the credit-card type, comprising optical means for ensuring a bi-directional transmission of information between the device and a terminal adapted to receive this device. In each direction, an optical transmission interface comprises a light-emitting diode/phototransistor pair, the two pairs and the associated electronic system thus being a substantial burden upon the cost price of the device.

SUMMARY OF THE INVENTION

Accordingly, the object of the present invention is to provide a system for the transmission of information between a portable article generating this information and means for processing this information, which system is reliable as regards the accuracy of the transmitted information and which is not a burden upon the production cost of the portable article.

A further object of the present invention is to provide such a system which represents the lowest possible drain upon the electrical power source incorporated in the portable article.

Yet a further object of the present invention is to provide a portable article and a reader of information computed by this article which are designed to form part of this system.

These objects of the invention are achieved with a system for the transmission of information between an article carrying information and means for processing this information, of the type in which the article comprises means for modulating the reflectance of at least one area of a liquid crystal device as a function of information to be transmitted to the processing means, the system further comprising a reader provided with a station for receiving the article, optical means disposed in this station and sensitive to the reflectance of the said area of the device to form signals representative of information given out by the article, and means for the transmission of these signals to the processing means, this system being characterised in that the liquid crystal device is constituted by a screen for the display of alphanumeric information, which screen is associated with means provided for selectively commanding (1) the display of alphanumeric characters on a plurality of areas of the screen in conformity with alphanumeric information computed in the article and (2) the binary modulation of the reflectance of at least one area of this screen for the transmission, to the reader, of binary information computed in the article.

According to a preferred embodiment of the invention, the liquid crystal screen of the article comprises a plurality of areas each commanded by the means for modulating the reflectance of this area as a function of alphanumeric information to be displayed or of binary information to be transmitted to the processing means, the reader then comprising one or more light sources arranged to illuminate the said areas of the screen and sensors which are each sensitive to that fraction of the light which is reflected by one of the illuminated areas, in such a manner as to ensure a transmission in parallel of binary information between the portable article and the processing means.

The reader may further comprise optical means for commanding operations preparatory to a transfer of information from the article to the reader, these means being constituted by at least one light source modulated as a function of command information emitted by the reader, the portable article comprising at least one photosensitive component placed opposite this source in order to deliver a signal to means for processing information from the article, which means are capable of preparing and executing the transfer of information.

The reader further comprises a comparator to compare the output signal of a photosensitive sensor with a reference signal and means for adjusting this reference signal as a function of at least one reflectance level of an area of the screen of the article placed in the receiving station, in preparation for a transfer of information, this reflectance level being representative of one of two conditions of a logic information to be transmitted optically during this transfer.

The reader may take the form of a terminal installed in a location accessible to the public. According to an embodiment of the invention, this terminal may be connected by a wired network to an information processing equipment remote from the terminal.

The article of the system may be portable and may further comprise photosensitive means arranged to receive optical signals from the reader, to command a preparation of the system for a transmission of information.

Thus, by virtue of the transmission system according to the invention, there is ensured a transmission of information from the portable article to processing means by using, as transmission interface, the liquid crystal screen of the article itself, while the latter is normally employed for other purposes. This leads to the ensuring of an automatic transmission of the information, which transmission is released from any human transcription error, which transmission does not rely upon any specialised interface such as an electrical connection, while still being capable of operating in parallel with such a connection if the latter is justified by other considerations. As a result of the elimination of this specialised interface, the production cost of the portable article is maintained at a low level compatible with applications involving the public at large, and there is a reduction in the quantity of electrical power drawn from the battery which supplies the portable article during a transmission of information, on account of the fact that for the purposes of this transmission use is made of a screen of the liquid crystal type, the electrical consumption of which is the lowest among the known display devices which are usable on a portable article.

BRIEF DESCRIPTION OF THE DRAWINGS

Further features and advantages of the system according to the present invention will become evident upon reading the description which will follow and upon examining the accompanying drawing, in which:

FIG. 1 is a diagrammatic perspective view of a portable article and of a reader forming part of the system according to the invention, the portable article being shown installed on the reader, FIG. 2 is a functional diagram which is useful in describing the constitution and the operation of the transmission system according to the invention, FIG. 3 is a perspective view of a strip of light-emitting diodes and of phototransistors associated with these diodes, forming part of the reader of the system according to the invention, FIG. 4 is a cross-sectional view of the strip of FIG. 3, passing through the axes of a diode and of an associated phototransistor, and FIG. 5 is a diagram of an electronic device associated with the strip of FIGS. 3 and 4 and forming part of the reader of the system according to the invention.

FIGS. 6(a) and 6(b) illustrate a 14-segment display, showing in FIG. 6(a) no opacification of segments, and in FIG. 6(b) simultaneous opacification of the areas of the display.

As shown in the figures, this transmission system is constituted essentially by a portable article 1 and by a reader 2 equipped with a receiving station 3 permitting the installation of the portable article on the reader.

This article is of the type described in the preamble of the present description and comprises, conventionally, information processing means protected by a module 4, this module further carrying a keyboard 5 to input information into the processing means and to command the operation of these means, and a display device comprising a liquid crystal screen 6 (also referred to as an LCD). For the activation of the transmission system according to the invention, the processing means and this screen 6 exhibit particular features which will be described in detail below. The power supply to the circuits and components of the portable article 1 is ensured by an electrical battery 7 (see FIG. 2). In this connection, it should be noted that the space requirement of this battery being necessarily limited in a portable article, it is also necessary to limit the consumption of the devices installed in the article in order to ensure a reasonable service life for the latter, before the possible replacement of the battery. It is accordingly an essential object of the present invention to install, between the portable article and the reader 2, an information transmission system which requires, on the part of this article, only a minimum quantity of power drawn from the battery. It will be seen in detail below how the invention enables this object to be achieved.

The information processing means provided in the portable article may comprise, conventionally, a microcontroller 8 supplied with information input by means of the keyboard and, in particular, a command circuit 9 for the liquid crystal screen 6, which is possibly integrated in the microcontroller. Such command circuits commonly appear in the catalogues of manufacturers of integrated circuits, in a version which is separate or integrated in the microcontroller, and do not require a detailed description.

The reader 2 of the system according to the invention comprises, in a module 10, not only the receiving station 3 of the portable article but also a keyboard 11 and a screen 12 of any known type, which are components conventionally disposed on any data processing terminal for the input and the display of data. A line 13 connects, as appropriate, the reader 2 to a centralised information processing equipment (not shown) which is interconnected, according to an embodiment of the invention, with the reader 2 by a wired network, of which the line 13 forms part. Another line 14 ensures the electrical power supply to the reader via the mains.

Such a reader may take the form of a terminal installed in a location accessible to the public in order to permit a large number of persons to transmit information contained in the portable article to the centralised processing equipment. As has been seen in the preamble of the present description, such a situation exists, where, for example, a data item linked to the result of a bet or other game, which data item is computed in the portable article in consequence of appropriate commands activated by a player by means of the keyboard 5 of the article, is to be transmitted to processing means permitting the claiming of the winnings of the player. Such a transmission implies, conventionally, the existence of a specialised linkage interface between the portable article and this equipment, of the electrical or radio type, for example. Such a specialised interface increases the cost of the portable article and involves an additional electrical power consumption which is an excessive drain on the power contained in the battery of the portable article.

According to the present invention, this additional specialised transmission interface is saved by using, in a particular manner which will be described in detail below, the liquid crystal display device which is normally provided for visually displaying data which are input into the processing means or results computed by the latter.

In order to do this, the display device comprises at least one area 16, the reflectance of which is modulable, under the command of the processing means incorporated in the portable article, as a function of a piece of information to be transmitted to the centralised processing equipment for these data.

For its part, the reader comprises, in the receiving station 3 of the portable article, optical means constituted by a light source 15 to illuminate the said area 16 ( for example a light-emitting diode or LED ) and a photosensitive sensor 17 ( for example a photo transistor), preferably directional, which is oriented towards this area along a selected direction. The light source may be supplied with electricity from the mains via the line 14, through a power supply circuit 26 which also produces supply voltages for the other components and circuits of the reader, these voltages being delivered on the output lines 27. By electrically modulating the reflectance of the area 16, as is conventially done to cause the appearance of dark-coloured characters on a light background in a liquid crystal display device, modulation takes place of the quantity of light reflected by the area 16 onto the axis of the optical sensor 17, which then produces an electrical signal modulated as the reflectance of the area 16. After filtering and shaping (in a signal-processing unit 18) of this signal, a digital signal is available, which passes into information processing means 20, for example a microprocessor, which are disposed in the reader 2. The digital information which is thus received by the microprocessor 20 is then in conformity with that emitted by the portable article 1 and transmitted, according to an essential feature of the present invention, by virtue of the liquid crystal screen 6, which is normally employed for other purposes and for a reading of an area of the latter, which reading is ensured by means of a directional photosensitive sensor.

The microprocessor supplied with the information thus received, for example relating to the winnings of a player, may initiate an action such as the issue of a ticket by a printer incorporated in the reader, the ticket carrying information permitting the player to claim these winnings, as will be seen below by way of non-limiting example.

The digital information received by the microprocessor 20 may also, according to another embodiment of the invention, be formatted and conformed in an interface 21 before being input onto the line 13 to be transmitted to the centralised processing equipment.

In a variant, the portable article 1 comprises a plurality of areas each commanded by means for modulating the reflectance of this area as a function of information to be transmitted to the processing equipment, the reader then comprising an equal number of light sources arranged each to illuminate one of the said areas of the screen and an equal number of sensors each sensitive to that fraction of the light of a source which is reflected by the area illuminated by this source, in such a manner as to ensure a transmission in parallel of information between the portable article and the processing means.

A detailed description will follow, in conjunction with FIGS. 3 to 5, of a particular embodiment of a transmission system designed to ensure such a transmission in parallel.

Thus, the system according to the invention permits the ensuring of an automatic transmission of information, i.e. without the errors which are involved in the manual transcription of a piece of information on a keyboard by a user, without this additional possibility being a burden upon the production cost of the portable article, which must be as low as possible in certain applications such as gaming or betting organised by media of the type set forth in the preamble of the present description. Of course, the microcontroller 8 present in the portable article must be appropriately programmed in accordance with a specialised protocol ensuring the command of the reflectance of the area 16 in accordance with the information to be transmitted. However, this essentially involves software means which do not imply the presence of supplementary hardware means of a substantial cost which might have an unfavourable effect on the cost of the portable article.

Moreover, the latter, just like the portable device described in the aforementioned European patent application, could be equipped with one or more photosensitive components 22 such as photodiodes or phototransistors arranged to cooperate with optical transmission means to ensure a reception, by the portable article, of information originating from outside this article.

According to the present invention, the reader 2 of the system according to the invention is thus equipped with optical command means, which are constituted by one or more photo-emitting components 23 such as, for example, light-emitting diodes.

The information to be transmitted is translated by the microprocessor 20 into a suitable command for a command circuit 24 for the photo-emitting components 23 which then translate the (digital) information to be transmitted into corresponding optical signals. The latter are then taken up by the photosensitive components 22 which are appropriately disposed, to this end, in the receiving station 3 in relation to the photo-emitters 23, and transmitted in the form of electrical signals carrying a piece of digital information, to the microprocessor 8 of the portable article, via a matching interface 25.

Thus, the portable article is able to receive information optionally. Such a transfer of information may be employed, for example, to prepare for the emission by the portable article of the signals to be transmitted to the processing means. The information which is optically transmitted to the portable article may relate, for example, to the type of information which the portable article is to transfer to the reader.

Reference is now made to FIGS. 3 to 5 of the accompanying drawing in order to describe in detail an embodiment of the reader forming part of the transmission system according to the invention, which system is designed, as has been indicated above, to ensure a transmission in parallel of information from the portable article to means for processing this information.

FIG. 3 shows a strip 28 including, by way of example, eight light-emitting diodes 15 which are aligned parallel to eight phototransistors 17, each diode being associated with a phototransistor to ensure the reading of information displayed on one of eight areas of aligned characters of the liquid crystal screen 6, which are placed opposite the strip 28. Preferably, partitions optically isolate each diode/phototransistor pair from the adjacent pairs. The strip 28 is arranged in the receiving station 3 of the reader 2 in such a manner that the insertion of the portable article 1 in the reader automatically ensures the placing in position, in alignment, of the screen 6 of the article and of the strip 28 of the reader.

FIG. 4 shows a cross-section of the strip 28 through a plane passing through the axis of a diode 15 and the axis of the sensitive surface of an associated phototransistor 17. It will be noted that the angle $\alpha$ which references the position of the axis of the sensitive surface of the phototransistor 17 in relation to the normal to the plane of the associated area of the screen of the liquid crystal display device 6 is preferably different from the angle $\beta$ which references the position of the axis of the diode 15 in relation to this same normal. In fact, for the majority of commercially available liquid crystal display devices the zone of perception of the best contrast corresponds to an angle $\alpha$ such as:

$$0 < \alpha < 20°$$

Accordingly, $\alpha$ should be selected within this range and, for example, the following values should be adopted:

$$\alpha = 15°$$

With regard to the angle $\beta$ of the axis of the associated diode, it is necessary to avoid, first of all, a situation in which a part of the light emitted by the diode is reflected by total reflection onto the screen of the display device, in the axis of the sensitive surface of the phototransistor 17. It is accordingly preferable that $\beta$ should be different from $\alpha$ if, for example for reasons of compactness, it is preferred that the plane of the axes of the diode and of the phototransistor which are associated should pass through the normal to the area 16 of which the commanded variations of reflectance are detected. This area normally corresponds to a character position of the screen.

Moreover, trials have shown that the level of variation of the light reflected by such an area of a liquid crystal screen passing from the "extinguished" state to the "illuminated" state is a maximum (approximately 40%) when it is measured on the axis referenced by the angle $\alpha$ selected as indicated above, when the angle $\beta$ of the diode is selected to be greater than $\alpha$, for example approximately 45°.

Having thus selected $\alpha$ and $\beta$, it is possible to maximise further the modulation of the light by the liquid crystal screen, by "blackening" to the greatest possible extent the character area illuminated by a diode for the transmission of a "0" logic signal, for example. In order to do this, a command is given for the simultaneous illumination of all the segments of one and the same character or "digit" area, i.e., for example, 14 segments. It is also possible to limit that part of the character area which is "seen" by the phototransistor, in such a manner that this character area encompasses a maximum surface area of segments.

In addition to the constraints set forth above in the matter of positioning of the elements of a diode/phototransistor pair capable of permitting the achievement of an optimal output (difference of the reflectances for the "0" and "1" levels), other constraints have to be taken into account concerning:

the selection, from among the components which are commercially available, of the diode/phototransistor pair ensuring the best cost/performance compromise, the operating temperature, on account of the fact that the reader of the system according to the invention is subjected to the environmental constraints of the location where it is placed, the capacity of the system to adapt to a reduction of the voltage of the battery 7 which powers the portable article, the effect of the ambient light on the performance parameters of the diode/phototransistor pairs employed for the reading of the liquid crystal screen, the influence of the commanded variations of reflectance of a character area (digit) on the adjacent areas.

As regards the selection of components, it is also necessary to take account of the space requirement of the latter, which should not exceed a diameter of 3 mm with the commercially available liquid crystal screens.

Of course, the sensitivity spectrum of the selected phototransistor must be matched to the emission spectrum of the diode. Moreover, a diode of high luminous power should preferably be selected, in order to combat effectively the effects of the ambient light. In this connection, it is also possible to select a diode with high output and/or to bring the components close to the screen, and/or to make the reader light-proof.

With regard to the phototransistor, this should preferably exhibit a small reception angle in order to avoid taking into account the modulations of reflectance of the adjacent character areas.

A pair which may be employed in the present invention is constituted by an emitting diode of type CQ593-P334NL and a BPW 22-AII phototransistor, both manufactured by the company known as RTC. Of course, numerous other pairs satisfying the criteria of selection defined above may be selected by a person skilled in the art from among the existing components.

Reference is now made to FIG. 5 of the accompanying drawing, which shows a diagram of an electronic device associated with the strip 28 of FIGS. 3 and 4 and installed in the reader 2 of the system according to the invention. This device essentially corresponds to the components 15, 17, 23 and to the units 18, 24 and 26 of the diagram of the reader 2 shown in FIG. 2.

In FIG. 5, it appears that eight light-emitting diodes (LED) 15 are supplied in series, by means of a line 31, between a terminal connected to a direct current power source, for example at +12 volts, and a terminal at −12 volts, for example (line 41). The power supply unit 26 is supplied by this source, and it is regulated to deliver, on the one hand, a voltage stabilised at +5 volts to the diodes and a voltage stabilised at +12 volts which is employed by other circuits or components of the reader 2 (see the lines 27 of FIG. 2). A switch 19 is placed in series with the stabilised power supply 26, and this switch is commanded by an "LED command" output of the microprocessor 20 which is programmed to energise the diodes 15 in preparation for a transmission of information emitted by a portable article 1 installed in the reader 2. In this connection, it will be noted that the receiving station of the reader comprises a tracer 46 or other detector sensitive to the presence of the article in the station, to pass a signal signifying an "article presence" to the microprocessor 20.

The collectors of eight phototransistors 17 are connected in parallel with a line 32 connected to a voltage source at +5 volts direct current. The emittor of the phototransistor 17 connected to a line 33 is also connected to the positive input of a comparator 47. The negative input of the comparator 47 is connected to the centre point of a voltage divider bridge constituted by resistors R1 and R2 connected in series between the emitter of the phototransistor 17 and ground, via an amplifier 48 and a switch 49 commanded by an "initialisation" output of the microprocessor 20 for a reason which will be explained below. A capacitor 51 is connected between the negative input of the comparator 47 and ground. A flip-flop 50 of the D type is interposed between the output of the comparator 47 and an "0" input of the microprocessor. This flip-flop is conventionally commanded by signals OE (output validation) and clock signals CLK emitted by the microprocessor in order thus to constitute an interface for the synchronisation of the signals which have come from the strip 28, for the microprocessor 20.

The subcircuit (R1, R2, 47, 48, 49, 50, 51) which has just been described is repeated as many times as the strip 28 is provided with diode/phototransistor pairs. For the sake of the clarity of FIG. 5, this subcircuit has been shown in one instance only. It corresponds to the unit 18 of the diagram of FIG. 2, which unit is employed to shape the signal delivered by the phototransistor 17. Its function is to convert the variations of the voltage on the emitter of the associated phototransistor 17, corresponding to "illuminated" or "extinguished" states of the associated character area of the screen of the display device into digital signals which are capable of being understood by the microprocessor, such as for example TTL or C-MOS level signals, according to the technology selected for this microprocessor.

In order to do this, the voltage on the emitter of the phototransistor is compared with a reference direct current voltage held in the capacitor 51. The dispersions of the characteristics of reflection of the liquid crystal display devices, of the emission characteristics of the diodes and of the reception characteristics of the phototransistors are such that the comparison threshold cannot be fixed in advance. Further, according to a feature of the present invention, prior to any transmission of information the microprocessor commands an initialisation of the comparators 47 by closing the switches 49 to charge the capacitor 51 to a threshold value which will be determined by the voltage on the collector of the phototransistor when the character areas are "extinguished" and by the reduction ratio established by the divider bridge (R1, R2). By selecting, for example, R1/R2=1/9, the threshold value held will be proportional to 90% of the voltage on the emitter of the phototransistor, the character area of the screen being "extinguished", this margin of 10% being considered as sufficient to ensure in all cases the switching of the output of the comparator 47 to "the illumination" of the character area, irrespective of the variations of contrast of the screen from one portable article to another, and the condition of the battery which powers it. In this connection, it should be noted that each one of the outputs 0 to 7, which are connected to an equal number of corresponding inputs of the microprocessor 20, is at "1" when the associated character area is "extinguished" (character segments invisible to the naked eye) and passes to zero when all the segments are rendered opaque to reduce the reflectance of the area of the character.

Of course, it would not amount to departing from the scope of the invention to initialise each comparator while all the segments of an area are rendered opaque, to charge the capacitor 51 by connecting it to the emitter of the phototransistor. In this case, in operation, the comparison is effected with an input signal of the comparator reduced, for example by 10%, by means of a bridge of resistors such as (R1, R2).

In both cases, the value of the capacitor is calculated as a function of the length of the messages to be transmitted in binary and of the leakage current.

According to the invention, the initialisation of the comparators (47) is effected prior to each transfer of binary information, the portable article being present in the reader, and while the screen (6) of the portable article is energised. Accordingly, the initialisation takes into account the effective reflectance of the background of the screen, which reflectance is linked to the supply voltage of the screen. Thus, it will be possible to take account of possible voltage surges of this power supply, when the latter is ensured by a new battery for example, or of undervoltages at the end of the service life of this battery. This then ensures a more precise detection of the "1" logic level, which detection is effected when the screen is "extinguished", the reflectance of the screen then being determined by the supply voltage and by the process employed to manufacture the screen.

FIG. 5 also shows the presence, in the strip 28, of two diodes $23_1$ and $23_2$ which are commanded by corresponding outputs of the microprocessor 20. These diodes correspond to the diodes 23 of the diagram of FIG. 2 and illuminate photosensitive components, for example phototransistors 22, incorporated in the circuit of the portable article 1. By these diodes, the microprocessor 20 of the reader may transmit digital information to the portable article. This is so in particular, as will be seen below, at the commencement of the execution of a protocol for the transmission of information from the portable article to the centralised processing equipment.

The operation of the system according to the invention is then established as follows. In order to undertake a transmission of information, the user presses a specific key of the keyboard 5 of the portable article. The article is thus prepared to receive information (type of information to be transmitted to the reader) preparatory to the transmission per se, via the phototransistors 22 placed opposite the diodes $23_1$ and $23_2$ which are commanded by the reader 2.

The article is then inserted into the receiving station 3 of the reader 2. The microprocessor 20 is warned of this insertion by the article presence detector 46. The microprocessor then commands the illumination of the diodes 15 and passes to the portable article, via the diodes $23_1$ and $23_2$, an instruction to extinguish the character areas of the screen 6 in order to permit the initialisation of the comparators 47. In fact, at the time of the insertion of the card into the reader certain areas could be rendered opaque or "illuminated"; this would disturb the initialisation of the associated comparators. Once the thresholds of the comparators have been regulated by the procedure described above, the microprocessor 8 of the portable article 1 commands the illumination of all the segments of all the character areas, for example for a period of 0.5 second, in order to check the regulation of the thresholds by a "0" state reception. The transmission of the information from the article to the reader may then commence on 8 bits, in parallel.

According to an application of the transmission system according to the invention, which application is described in the aforementioned European patent application, the information relates to winnings obtained by a player. The portable article takes the form of a "card" which then emits to the reader a "winnings certificate". As has been seen above, the reader then takes the form of a terminal installed in a public location, for "self service" use. The terminal receives and processes in the microprocessor 20 the information received from the card. The microprocessor 20 of the terminal is programmed to apply a procedure for the detection of errors and a procedure for the detection of "end of transmission" to the information thus transmitted. For the transmission of the information, the microcontroller 8 of the card commands the opacification of the eight character areas of the LCD screen 6 as a function of the information to be transmitted to the processing equipment. Various procedures may be employed to signal the end of the transmission. By way of example, the latter may become operative when bits in a predetermined number, for example 40, have been transmitted, this number corresponding to the maximum format of the transmission.

According to a preferred embodiment of the invention, the terminal 2 comprises a printer 52 commanded by the microprocessor 20 to issue a hard information medium such as a ticket which appears at an output 53 of the terminal (see FIGS. 1 and 2) in order that the player should be able to retain a hard-copy record of the transmission effected and to make use of this ticket in order to claim these wirings.

According to another embodiment of the invention, the terminal transmits via a line 13 to a centralised processing equipment the information received from the card.

The "winnings" information thus transmitted to the processing equipment is then allated to an account specific to the player, with a view to a subsequent claiming of his winnings.

Once the transmission has been completed, the user of the article removes the latter from the terminal. The microprocessor 20 is warned of this removal by the detector 46 and commands the extinction of the diodes 15

The security of the operation of the system according to the invention may be strengthened by a procedure for testing the reader, which procedure is implemented upon the energisation of this reader, for example, in the absence of any portable article in the reader. This procedure then comprises an energisation of the strip of diodes, the light emitted by the diodes then being deflected onto the sensors by a reflecting surface placed, for this purpose, in the receiving station, an initialisation of the comparators to the "1" level at the output, an extinction of the diodes and a verification of the fact that the eight outputs must then pass to zero. It will be noted, in this connection, that as the diodes 15 are connected in series (see FIG. 5) the test will be negative if a single diode is defective.

Thus, the system according to the invention permits the ensuring of an automatic and secure transmission of information, from a portable article which is provided, for example, in the form of a "card", to means for processing this information without relying upon a physical interface other than a liquid crystal screen display device which is in any event present on the card for other purposes.

By virtue of the utilisation of a liquid crystal screen, the power consumption of which is very low, the transmission represents only a very slight drain upon the power contained in the supply battery, which ensures the independence of the card.

Of course, the optical and optoelectronic means employed in the present invention, to ensure a transfer of information, may take various forms and are capable of adaptation, as will readily be recognised by a person skilled in the art, especially as a function of the type of liquid crystal display device employed. Numerous directional photosensitive sensors are available on the market to constitute the sensors 17. The same applies to the diodes 17, except for the limitations mentioned above. Numerous liquid crystal screen display devices are also usable. By way of example, the display device referenced FRD 0346P in the catalogues of the company OPTREX ensures a display of information with a sufficient contrast. In connection with this matter, it should be noted that this sufficient contrast does not need to be high since, as the transmission of digital information is involved, the signal delivered by the sensor may exhibit a moderate dynamic range.

In the aforegoing, the article 1 is described as being portable on account of the fact that this characteristic is necessary in an application of the system according to the invention to the transmission of winnings achieved by a player to a centralised information processing equipment which collects these winnings via terminals (readers) accessible to the public.

It is clear, however, that the invention is not limited to a system designed exclusively for such applications and, on the contrary, extends to any system ensuring a transmission of information via an automatic reading of a liquid crystal screen or, more generally, of a screen comprising areas of which it is possible to vary the reflectance. Thus, the invention extends to systems in which the article is not portable, it being possible for the reader to be so, or indeed alternatively to systems in which neither the article nor the reader is portable.

We claim:

1. System for the transmission of information between an article carrying information and means for processing the information carried by the article, in which the article comprises means for modulating the reflectance of at least one area of a liquid crystal device as a function of information to be transmitted to the processing means, the system further comprising a reader having a station for receiving the article, optical means disposed in said station and sensitive to the reflectance of said area of said liquid crystal device to form signals representative of information given out by said article, and means for transmission of said signals to said processing means, said liquid crystal device being constituted by a screen for the display of alphanumeric information, which screen is associated with means provided for selectively commanding the display of alphanumeric characters on a plurality of areas of said screen in conformity with alphanumeric information computed in said article and the binary time modulation of the reflectance of at lest one character area of said screen for the transmission, to said reader, of serial binary information computed in said article.

2. System according to claim 1, wherein said liquid crystal screen of said article comprises a plurality of character areas each commanded by said means for modulating the reflectance of said character areas as a function of binary information to be transmitted to said processing equipment, said reader then comprising one or more light sources arranged to illuminate said regions of said screen and sensors which are each sensitive to the fraction of the light which is reflected by one of said illuminated areas, to ensure a transmission in parallel of serial binary information between said portable article and said processing means.

3. System according to claim 1, wherein said reader further comprises optical means for commanding operations preparatory to a transfer of information from said article to said reader, said optical means comprising at least one light source modulated as a function of command information emitted by said reader, means for processing information from said article, said article comprising at least one photosensitive component placed opposite said source in order to deliver a signal to said means for processing information from said article, said means for processing information from said article being capable of preparing and executing the transfer of information.

4. Article comprising means for storing binary information to be transmitted to external means for processing said information, and means for commanding the modulation of the reflectance of at least one area of a liquid crystal device forming part of said article, as a function of said information, to permit the transmission of said information by an automatic optical reading of the reflectance of said area, which reading is effected by a reader, wherein said liquid crystal device is a screen comprising a plurality of alphanumeric character display areas, said screen being associated with means for selectively commanding (a) said display of alphanumeric characters on the areas of said screen, in conformity with alphanumeric information to be visually displayed and computed in said article and (b) a time modulation of the reflectance of at least one character area of said screen between two levels of reflectance for the transmission, to said processing means, of serial binary information computed in said article.

5. Article according to claim 4, in which each area is divided into segments which can individually be opacified, wherein said means command the simultaneous clearing or opacification of all the segments to transmit to said reader a first or a second state of an information in binary logic.

6. Article according to claim 4, further comprising photosensitive means in said article for receiving optical signals from said reader, to command a preparation of said system for a transmission of information.

7. Article according to claim 4, wherein said article is portable.

* * * * *